(12) United States Patent
Burns

(10) Patent No.: US 6,304,685 B1
(45) Date of Patent: Oct. 16, 2001

(54) LOW DRIVE VOLTAGE LINBO₃ INTENSITY MODULATOR WITH REDUCED ELECTRODE LOSS

(75) Inventor: William K. Burns, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/566,237

(22) Filed: May 5, 2000

(51) Int. Cl.⁷ .................................................. G02F 1/035
(52) U.S. Cl. .................. 385/3; 385/1; 385/2; 385/14; 385/39; 385/40; 385/129; 385/130
(58) Field of Search .................................. 385/14, 15, 1, 385/2, 3, 129, 130, 131, 132, 141, 39, 40

(56) References Cited

U.S. PATENT DOCUMENTS

| 5,208,697 | * | 5/1993 | Schaffner et al. | 359/254 |
| 5,416,859 | | 5/1995 | Burns et al. | 385/3 |
| 5,422,966 | | 6/1995 | Gopalakrishnan et al. | 385/2 |
| 5,502,780 | * | 3/1996 | Madabhushi | 385/3 |
| 5,787,211 | * | 7/1998 | Gopalakrishnan | 385/2 |
| 5,886,807 | | 3/1999 | Cummings | 359/263 |
| 6,016,198 | | 1/2000 | Burns et al. | 356/345 |
| 6,033,126 | * | 3/2000 | Omori et al. | 385/88 |

OTHER PUBLICATIONS

Gupto et al., Microstrip Lines and Slotlines, 2nd Ed., Artech House, Boston, pp. 83–85, 1996.
Burns et al., Broadband Reflection Traveling—Wave LiNbO₃ Modulator, IEEE Photon. Tech. Ltrs., vol. 10, No. 6., pp. 805–806, 1998.
Noguchi et al., A Broadband Ti: LiNbO₃ Optical Modulator with a Ridge Structure, J. Lghtw. Tech, vol. 13, No. 6, pp. 1164–1168, 1995.
Burns, Prospects for Low Drive Voltage LiNbO₃ Broadband Modulators, IEEE AP–5 Symposium, Montreal, 1997.

* cited by examiner

Primary Examiner—Brian Healy
(74) Attorney, Agent, or Firm—John J. Karasek; Charles J. Stockstill

(57) ABSTRACT

This device is a broadband, electro-optic modulator comprising an exemplary coplanar waveguide (CPW) electrode structure on an exemplary Mach-Zehnder interferometer. The modulator is formed on a lithium niobate (LiNbO₃) substrate that is etched so as to form ridges upon which a gold center electrode and two gold grounded waveguides are deposited upon a buffer layer of silicon dioxide (SiO₂) to form a coplanar waveguide electrode structure having a waveguide mode for receiving an electrical signal propagating therethrough in a first direction with a second phase velocity to phase modulate an optical light in the optical waveguide at a frequency in the range from 0 Hz to substantially 40 GHz. The ridges formed by the etching of the substrate acts to lower the effective dielectric constant of the structure, and as the spacing between electrodes is increased, the overlap integral gets larger as the electrical field becomes more vertical, and better confined, and the intrinsic electrical loss coefficient is reduced and the electrical losses through the device become smaller requiring less voltage to modulate the optical signal.

22 Claims, 4 Drawing Sheets

LOW DRIVE VOLTAGE LINBO₃ INTENSITY MODULATOR WITH REDUCED ELECTRODE LOSS

BACKGROUND OF THE INVENTION

1. Field of the Invention

This invention pertains generally to optical intensity modulators and more specifically to a design of a device that reduces the ohmic loss in the electrode structure of a traveling wave $LiNbO_3$ intensity modulator without significant reduction of the modulator voltage-length product resulting in reduction of the high frequency drive voltage of the modulator.

2. Description of the Related Art

Traveling wave $LiNbO_3$ intensity modulators are of great interest for analog radio frequency (RF) and microwave link applications, E-field sensor, and digital and analog communications. Of particular interest is the drive voltage of the modulator as this quantity determines link gain, sensor sensitivity, and drive power requirements for high-speed (40 GHz) analog and digital links. In velocity matched, traveling wave devices drive voltage is determined by the low frequency voltage-length product; velocity and impedance match; and electrical (Ohmic) losses in the traveling wave electrode structure.

High speed, broad bandwidth integrated optical modulators are made by constructing a traveling wave coplanar waveguide (CPW) electrode structure on the top surface of an optical waveguide modulator, typically made on a $LiNbO_3$ substrate. In general these devices are Mach-Zehnder interferometers operated with a push-pull electrode structure, so that the fields of opposite polarity operate on each arm of the waveguide. These fields serve to change the index of the electro-optic $LiNbO_3$, which in turn alters the phase of the light traveling in each waveguide, and thus allows operation of the interferometer. The optical phase or amplitude modulation results from an interaction between the optical wave in the optical waveguide and the microwave wave guided by the coplanar electrode structure. Bandwidth can be limited by optical-microwave phase mismatch (the two waves typically travel at different velocities, depending on the design of the device), by radio frequency (RF) or ohmic loss in the electroplated gold electrode structure, and by electrical coupling between the coplanar microwave mode and leaky substrate modes.

For a coplanar waveguide (CPW) traveling wave electrode structure on Z-cut $LiNbO_3$, the electrodes are placed above the waveguides on the interferometer. The use of the etched regions in the $LiNbO_3$ between and outside of the waveguides, resulting in "etched ridge" waveguides, has been shown to make it easier to achieve velocity matching for an impedance matched (near 50 Ohm) electrode structure. The geometry of the interferometer (separation of the waveguides) and the electrode structure (gap between the center and ground electrodes) are then interrelated in that the electrode gap essentially equals the waveguide separation. These quantities affect the modulator drive voltage differently, as follows, first, for a given voltage across the electrodes, increasing electrode separation decreases the electric field across the waveguides, as field~voltage/gap. This generally results in an increased voltage-length product and an increased drive voltage. Secondly, as the electrode gap increases the electrical losses in the CPW structure are known to decrease, resulting in lower losses along the line which would result in a decrease in high frequency drive voltage.

In the prior art, U.S. Pat. No. 5,416,859, Burns et al., issued May 16, 1995, a broadband electro-optic modulator is taught having a substrate of sufficiently small thickness so that coupling between the coplanar mode of the coplanar waveguide electrode structure and any one of the substrate modes of the substrate does not occur over a desired frequency bandwidth of operation, and has a coplanar electrode structure of sufficiently large thickness so that the second phase velocity of the electrical signal is substantially equal to the first phase velocity of the optical signal.

Typical values for the electrode and waveguide separation in use currently are 15–25 $\mu$m. It is shown here that for Z-cut $LiNbO_3$ values in the 40–80 $\mu$m range can provide significantly reduced electrode losses without significant increase in voltage-length product. This will result in lower device drive voltage at higher frequencies.

SUMMARY OF THE INVENTION

The object of this invention is to provide a device that reduces ohmic electrode loss in a coplanar electrode structure for a given device length with a minimal associated increase in voltage-length product for this orientation of $LiNbO_3$ substrate so as to reduce the high frequency (40 GHz) drive voltage of the modulator.

This and other objectives are achieved by a broadband, electro-optic modulator comprising an exemplary coplanar waveguide (CPW) electrode structure in an exemplary Mach-Zehnder interferometer. The modulator is formed on a lithium niobate ($LiNbO_3$) substrate that is etched so as to form ridges upon which a gold center electrode and two gold grounded electrodes are deposited upon a buffer layer of silicon dioxide ($SiO_2$) or other insulating layer to form a coplanar waveguide electrode structure having a waveguide mode for receiving an electrical signal propagating therethrough in a first direction with a second phase velocity to phase modulate an optical light in the optical waveguide at a frequency in the range from 0 Hz to substantially 40 GHz. The ridges formed by the etching of the substrate acts to lower the effective dielectric constant of the structure, and as the spacing between electrodes is increased, the overlap integral gets larger as the electrical field becomes more vertical and better confined and the intrinsic electric loss coefficient is reduced and the electrical losses through the device become smaller requiring less voltage to modulate the optical signal.

DESCRIPTION OF THE PREFERRED EMBODIMENT

Figure 1A:
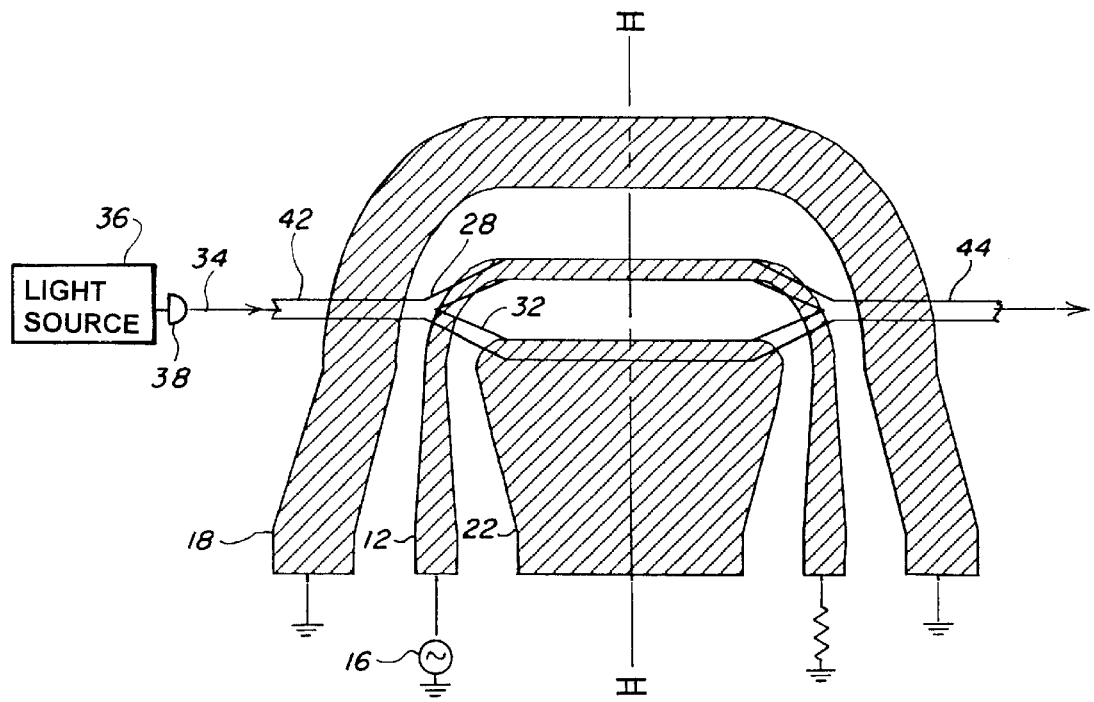
FIG. 1*a* shows an exemplary coplanar waveguide (CPW) electrode structure on an exemplary Mach-Zehnder interferometer modulator.
Figure 1B:
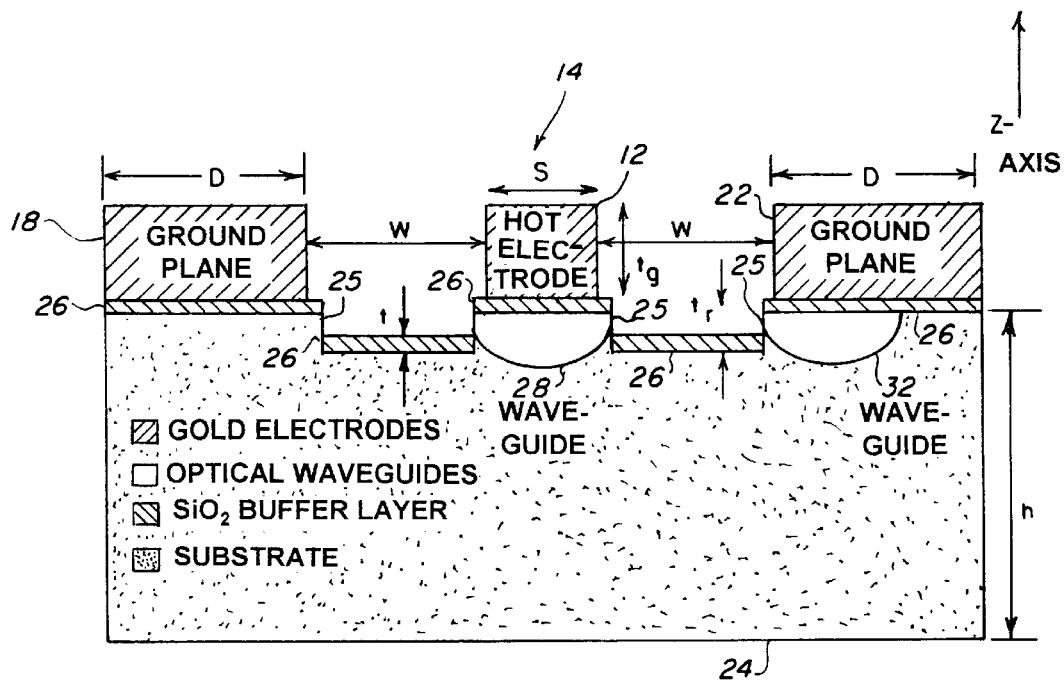
FIG. 1*b* shows a cross-sectional view through the Section II—II of FIG. 1*a* of the coplanar waveguide electrode and Mach-Zehnder interferometer.

The preferred embodiment, as shown in FIGS. 1a and 1b, illustrates an exemplary coplanar waveguide (CPW) electrode structure on an exemplary Mach-Zehnder interferometer. The device 10, as shown in FIGS. 1a and 1b, is comprised of a center or hot electrode 12, to which a modulating signal 14 from an microwave signal source 16 is applied, and two ground planes or grounded electrodes 18 and 22 on opposite sides of the hot central electrode 12 disposed on a substrate 24, typically, of Z-cut lithium niobate ($LiNbO_3$) having a mean dielectric constant of approximately 35, or it may be lithium tantalate ($LiTaO_3$) or any other ferroelectric of such thickness h to avoid electrical leakage. (It should be noted that FIG. 1b shows the Z-cut $LiNbO_3$ substrate 24, where the Z-axis is normal to the plane of the $LiNbO_3$ substrate 24.)

The electrodes 12, 18 and 22 are typically made of gold. However, the electrodes 12, 18, and 22 may be made of copper or any other high conductivity material. Larger electrode thickness are possible, the only limitation being the thickness that can be plated with the equipment and processes available. The inter-electrode gap width, W, between the center electrode 12 and each of the grounded electrodes 18 and 22 is selected to be typically between 15 and 25 $\mu$m, while the grounded electrodes 18 and 22 typically have an electrode width of a few mm and the center electrode 12 a width, S, of 8 $\mu$m. Electrode thickness is typically between 10–30 $\mu$m. As the inter-electrode gap width, W, increases it would normally be expected that the device would become less efficient because the field goes down and the electro-optic interaction is reduced. However, as disclosed here, as the inter-electrode gap width, W, increases, the overlap integral, $\delta$ (the measure of the efficiency of the overlap of the electrical field with the optical field), increases because, with the introduction of the etched ridges in the substrate 24, the vertical component of the electrical field 34 is increased and its confinement is improved. This increase of the overlap integral tends to compensate for the other effect of the increase in interelectrode gap width, W, which is a decrease in the magnitude of the electric field for a given voltage. The combined effect of an increased overlap integral and a decreased electric field, caused by the increase in gap width, W, can be quantified by the voltage-length product, which gives the low frequency drive voltage for a given length device. Drive voltage is inversely proportional to length so the product of device length times drive voltage is a constant. It is desirable that this constant be as small as possible.

The result of this is that if the device 10 were made twice as long, there would be twice the interaction length and one-half the voltage at low frequency would be required to drive the device 10. Nominally, the device 10 is ~4 cm in length in the active (electrode) region. The low frequency drive voltage may be increased or decreased by changing the length of the device 10.

The substrate 24 has electro-optic effects, and is etched to form a ridge structure having a depth, $t_r$, of typically 4 $\mu$m under the electrodes 12, 18 and 22 and coated with a typical silicon dioxide ($SiO_2$) buffer layer 26 having a typical thickness, t, of 0.6–0.9 $\mu$m. However, the buffer layer 26 may also be either a ceramic, a polymer, or a multilayer combination of silicon dioxide and a ceramic. The ridge depth, and the electrode thickness, are adjusted for a given geometry of the electrode structure to achieve velocity matching (equal electrical and optical phase velocities), simultaneously with an impedance near 50 $\Omega$. The effect of the etched ridge is to remove some of the substrate 24 high dielectric material and replace it with air (which has a dielectric constant of unity). This lowers the effective index of the electrical wave making it easier to achieve the conditions stated above.

In addition, the substrate 24 contains two optical waveguides 28 and 32 under electrodes 12 and 22, respectively. An optical modulator having a ridge structure is shown in Noguchi et al., A BROADBAND Ti:$LiNbO_3$ OPTICAL MODULATOR WITH A RIDGE STRUCTURE, J. Lightwave Tech. Vol. 13, No. 6, pp. 1164–1168, June 1995, and Burns, PROSPECTS FOR LOW DRIVE VOLTAGE $LiNbO_3$ BROADBAND MODULATORS, IEEE AP-S Symposium, Montreal, Que., Canada, 1997. The optical waveguides 28 and 32 are optically connected together at one end 42 and at a second end 44 to form a Mach-Zehnder interferometer configuration. The optical waveguides 28 and 32 are formed by depositing a strip of Titanium (Ti) metal on the surface of the $LiNbO_3$ substrate 24 and diffusing it into the surface of the $LiNbO_3$ substrate 24 at high temperature by techniques well known to those skilled in the art. The optical phase velocity of the Mach-Zehnder structure is fixed by the index of refraction of the $LiNbO_3$ which is approximately 2.2. The forming of the optical waveguides 28 and 32 is done before the $SiO_2$ buffer layer 26 and the electrodes 12, 18 and 22 are deposited but after the substrate 24 has been etched to a depth $t_r$. The thickness, h, of the substrate 24 is not critical, typically approximately 0.5 mm, or less, is utilized.

The object of velocity matching in the invention is to implement the optical intensity modulators of FIGS. 1a and 1b so as to cause the velocity of the microwave wave to be the same as or substantially equal to the velocity of the optical wave. That will result in an improved optical response for the optical modulator. The velocity of the optical wave is the velocity of light divided by the optical effective index, while the velocity of the microwave wave is the velocity of light divided by the microwave effective index. By etching the substrate 24 to form the ridge under the electrodes 12, 18, and 22 while increasing the inter-electrode gap, W, the design is being manipulated so as to achieve low microwave losses in the coplanar waveguide structure and still maintain velocity matching and near impedance match with an external 50 $\Omega$ system.

Portions of the electrodes 12, 18 and 22 extend in parallel paths over an electrode interaction region of length L (to be explained below) which is parallel to the legs 28 and 32 of the Mach-Zehnder interferometer forming the optical waveguide structure. The $SiO_2$ buffer layer 26 isolates the optical waveguides 28 and 32 from the metal electrodes 12, 18, and 22 of the coplanar waveguide structure to prevent optical loss.

In operation, an optical light 34 from an optical light source 36, such as a laser, typically a CW laser, is focused by a lens 38 onto the optical waveguide 42 and thus into the optical waveguides 28 and 32 forming the legs of the Mach-Zehnder interferometer and propagates through the legs 28 and 32. At the same time, a digital or analog modulating microwave drive signal 14 at a typical amplitude of 4 to 5 volts peak and a frequency in the typical range from 0 Hz up to 40 GHz, is applied from the microwave source 16 to the coplanar waveguide structure (between the center electrode 12 and each of the grounded electrodes 18 and 22) on the same side of the optical modulator as the optical light 34 is transmitted in the optical waveguides 28 and 32. The low drive voltage signal of up to 4 to 5 volts results in a highly efficient optical modulator. The modulating drive signal 14 modulates the phase of the propagating optical light 34 or optical wave at the frequency of the microwave drive signal 14. More particularly, the optical phase modulation results from an interaction between the optical wave 34 and the microwave drive signal 14 in the electro-optic $LiNbO_3$ structure.

The microwave effective index of the CPW mode for a given geometry of the electrode structure is determined by the thickness of the electrodes 12, 18, and 22 and the geometry of the ridge structure underneath the electrodes 12, 18, and 22. For a given geometry, the electrodes 12, 18, and 22 thickness can be adjusted so that the coplanar waveguide microwave effective index is equal to the optical effective index in the optical waveguide.

Alternatively other types of interferometers, such as a reflection Mach-Zehnder interferometer may be used. Further, the device 10 may be used with or without etched ridges, however, it must be realized by those who are skilled in the art that the impedance match to 50 Ω is not generally as good as the device set forth above.

Figure 2:
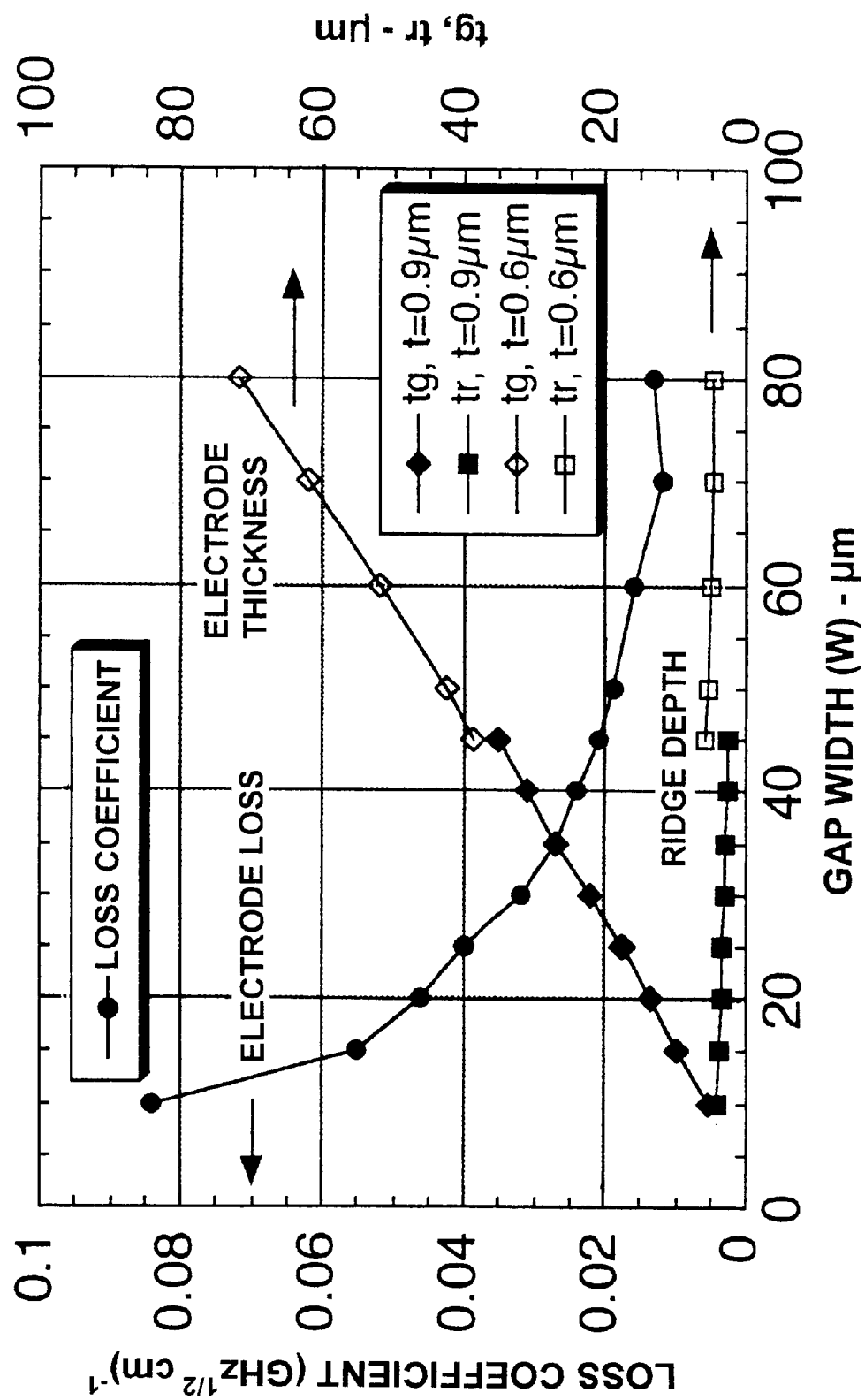
FIG. 2 shows electrical loss coefficient vs. gap width for required electrode thickness and ridge depths to maintain velocity match and a 45 Ohm impedance electrode structure.

One can use the finite element method to calculate the effect of a variation of the gap width, W, on the structure. For a center electrode 12 width, S, of 8 μm, and a $SiO_2$ buffer layer 26 thickness, t, of 0.9 or 0.6 μm, the electrode 12, 18, and 22 thickness, $t_g$, and ridge depth 25, $t_r$, are calculated to provide velocity match (effective index of 2.15) and a line impedance of 50 Ω, typically, however other impedances may be used. Geometries providing these velocity matched structures are shown in FIG. 2, for an impedance of 45 Ω. FIG. 2 shows the required electrode 12, 18, and 22 thickness and depth of the ridge 25 to maintain the desired conditions. It also shows in separate calculations, but still on the same figure, the electrode loss coefficient for the corresponding coplanar waveguide structures. It shows that the loss coefficient decreases by almost a factor of 4 from 0.04 to 0.01 $(GHz^{1/2} cm)^{-1}$ as the interelectrode gap separation W is increased from 25 μm to 70–80 μm. For each structure the Ohmic electrode loss was calculated using Wheeler's incremental inductance method. See, Gupta et al., MICROSTRIP LINES AND SLOTLINES, $2_{nd}$ Ed., Artech House, Boston, pg. 83, 1996. The electrode loss is shown to significantly decrease as W increases, although the electrode thickness 22 and ridge depth 24 must be continuously adjusted to maintain velocity and near-impedance match.

Figure 3:
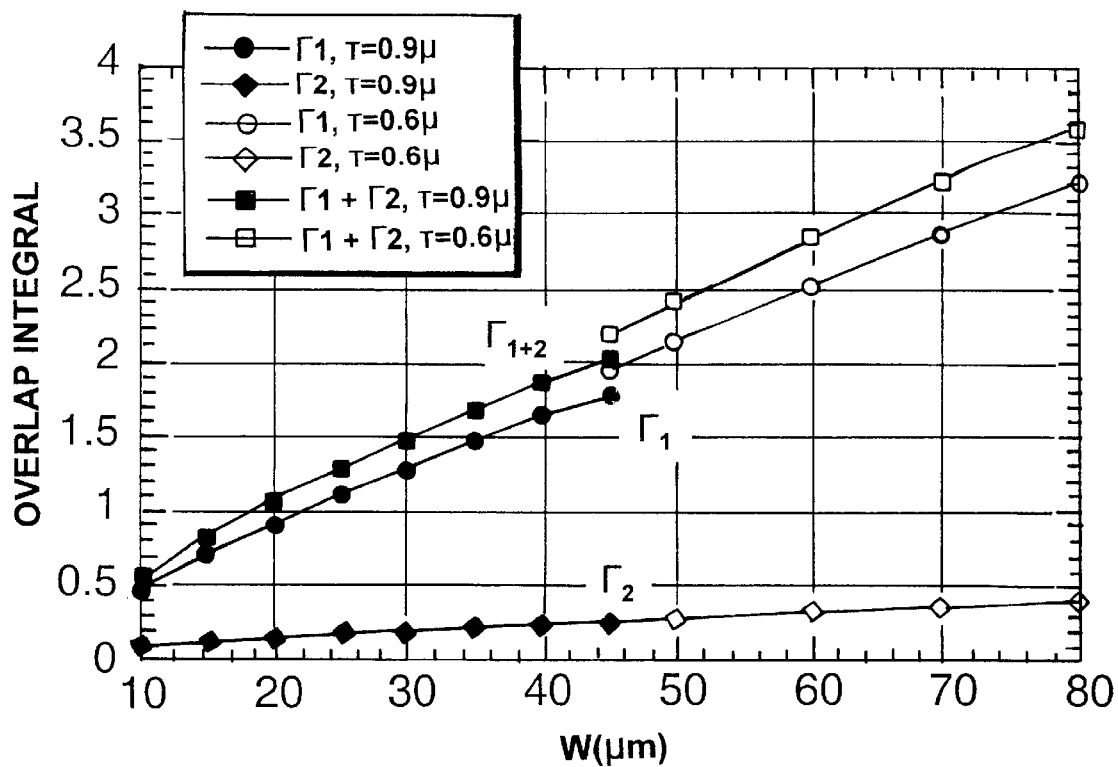
FIG. 3 shows overlap integral vs. electrode separation for z-cut material, for the structures defined by FIG. 2.
Figure 4:
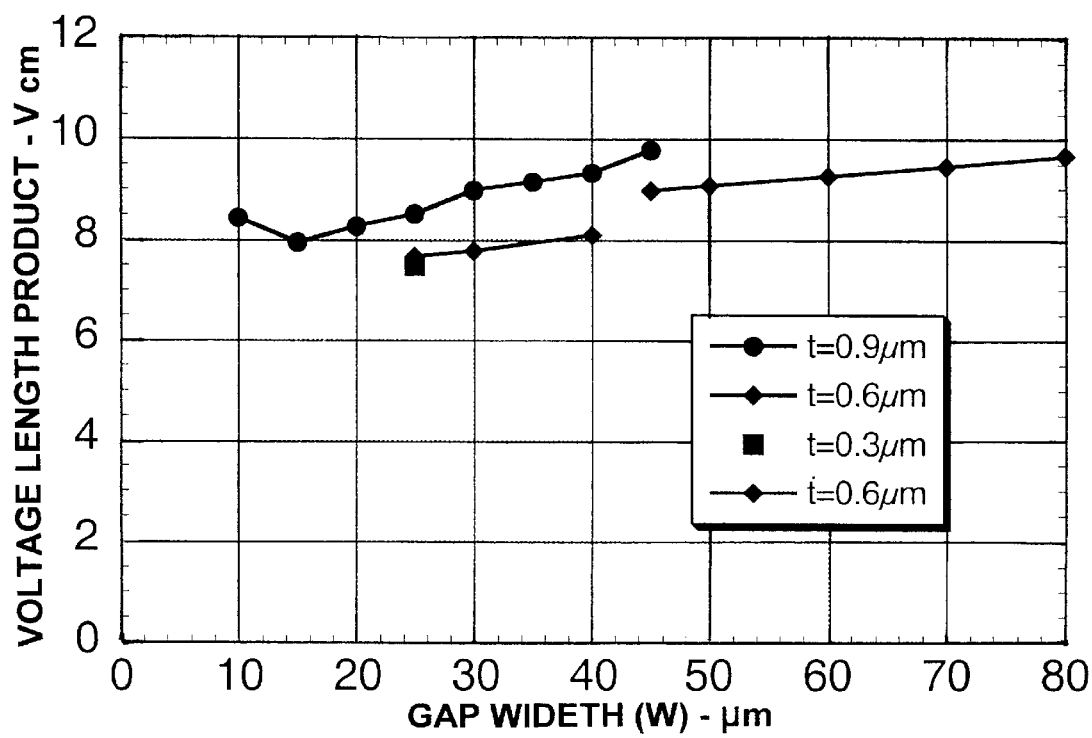
FIG. 4 shows voltage length product vs. gap width for various buffer layer thicknesses, for the structures defined by FIG. 2.

Using the fields generated in the finite element calculations, and experimentally known optical field profiles of the waveguide modes for a wavelength of 1.3 μm, the electro-optic overlap integrals shown in FIG. 3 are then calculated. Shown are the overlap integral at each waveguide 28, $\Gamma_1$, and 32, $\Gamma_2$, and the sum of the two contributions ($\Gamma_1+\Gamma_2$). Using these results the voltage-length products 34 vs. gap width 36 can be calculated, as shown in FIG. 4. As shown the overlap integrals 38 increase linearly with gap width 36, and the voltage-length product 42 only increases slightly over the range of interest. In effect the increase in overlap integral 38 compensates for the reduction in field as the gap width 36 increases. This allows the achievement of significantly reduced electrode losses at the penalty of only slightly increased voltage-length product.

Figure 5:
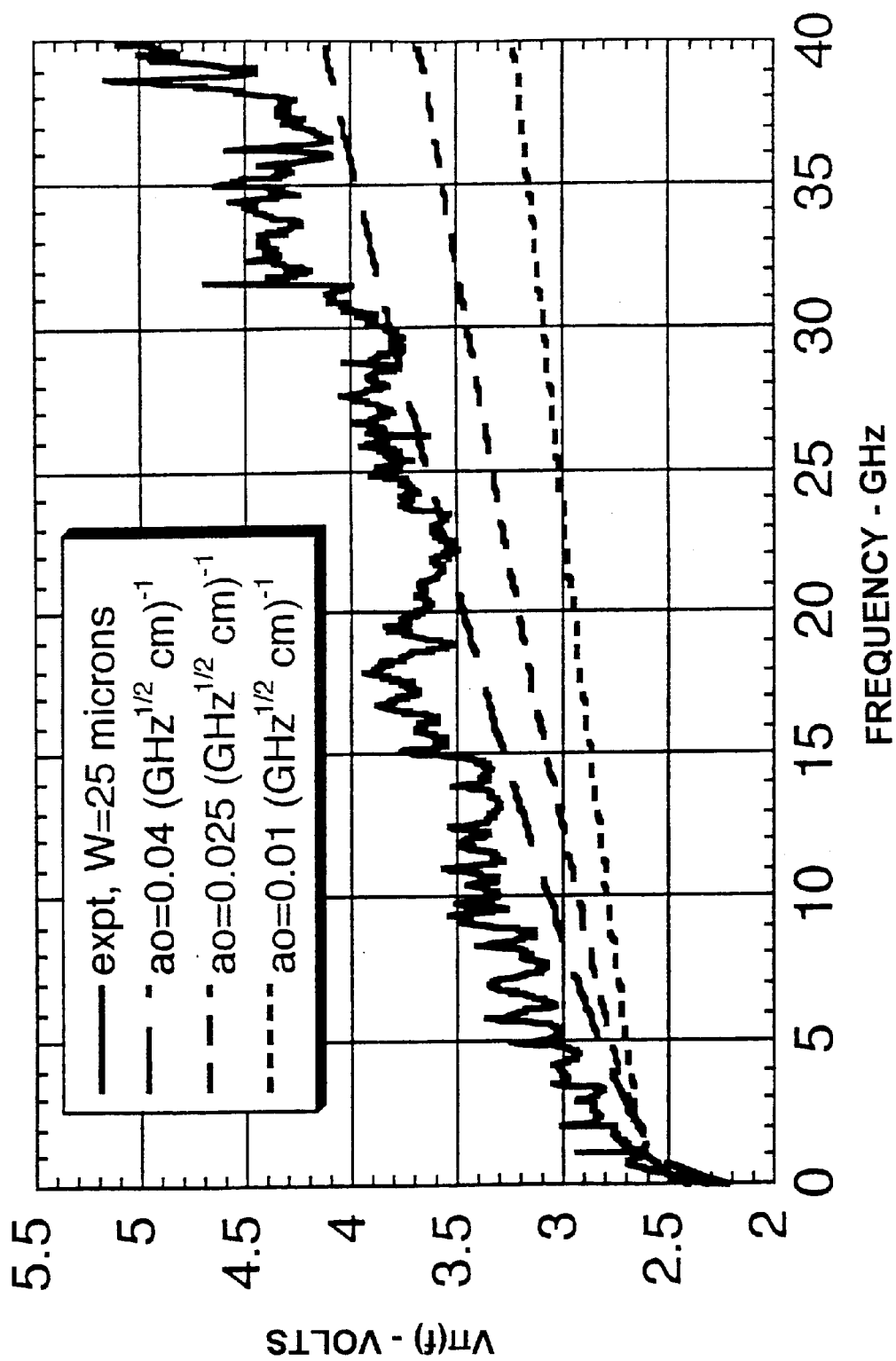
FIG. 5 shows the effect of the voltage length product at DC and the electrical loss coefficient, where calculated drive voltage 44 vs. frequency 46 is shown for 3 loss coefficients and voltage length products corresponding to W=25, 40, and 70 $\mu$m. Also shown is an experimental result for W=25 $\mu$m.

The benefit of this design is shown in FIG. 5, which shows the effect of reduced electrical loss coefficient ($\alpha_0$) and the very slight increase in voltage length product at DC, where calculated drive voltage 44, Vπ vs. frequency 46 is shown for 3 loss coefficients corresponding to W=25, 40, and 70 μm. Also shown is a current experimental result for W=25 μm. These calculations include the effect of both electrical loss and voltage-length product, as a function of W and frequency.

Where the prior art in U.S. Pat. No. 5,416,859 taught the reduction of radiation losses due to coupling of the microwave signal to the substrate modes, the object of this invention is to obtain broadband operation in an electro-optic modulator with a minimal drive voltage. It is the design of the structure that gives the reduced ohmic loss without compromising the low frequency operation which is expressed in the voltage-length product.

The new features taught in this invention is that an increase in gap width, W, to minimize the electrode loss can be accomplished without associated increase in the voltage-length product when an etched-ridge, coplanar waveguide structure is used in Z-cut $LiNbO_3$. This reduces drive voltage at high frequencies for a given device length, because the associated increase in voltage-length product for this orientation of $LiNbO_3$ is minimal.

Although this invention has been described in relation to an exemplary embodiment thereof, it will be understood by those skilled in the art that still other variations and modifications can be affected in the preferred embodiment without detracting from the scope and spirit of the invention as described in the claims.

What is claimed:

1. An electro-optic modulator comprising:
    a substrate having an electro-optic effect, and a plurality of optical waveguides for receiving and transmitting light therethrough in a selected direction and with a first phase velocity;
    said substrate having a plurality of etched ridge structures of a predetermined depth and separation between ridges;
    a buffer layer disposed on the plurality of ridge structures;
    a microwave waveguide electrode structure disposed on a preselected plurality of preselected ridge structures and receiving an electrical signal, propagating in said selected direction with a second phase velocity, modulating the light in the plurality of optical waveguides traveling in said selected direction as a function and frequency of the electrical signal, said first phase velocity being substantially the same as said second phase velocity;
    said microwave electrode structure being comprised of a center electrode and two grounded electrodes, and
    wherein the inter-electrode gap width, W, between the center electrode and the grounded electrodes is greater than 30 μm.

2. The electro-optic modulator, as in claim 1, wherein the substrate is Z-cut lithium niobate.

3. The electro-optic modulator, as in claim 2, wherein each of said center and grounded electrodes are comprised of gold.

4. The electro-optic modulator, as in claim 2, wherein each of said center and grounded electrodes are comprised of copper.

5. The electro-optic modulator, as in claim 2, wherein each of said center and grounded electrodes are comprised of any high conductivity material.

6. The electro-optic modulator, as in claim 1, wherein said buffer layer is silicon dioxide.

7. The electro-optic modulator, as in claim 1, wherein said substrate is comprised of Z-cut lithium tantalate ($LiTaO_3$).

8. The electro-optic modulator, as in claim 1, wherein said substrate is comprised of any Z-cut ferroelectric material.

9. The electro-optic modulator, as in claim 1, wherein said plurality of optical waveguides is a Mach-Zehnder interferometer comprising a first and second optical waveguide.

10. The electro-optic modulator, as in claim 9, wherein said first optical waveguide is disposed underneath said center electrode; and said second optical waveguide is disposed underneath one of the grounded electrodes.

11. The electro-optic modulator, as in claim 1, wherein said buffer layer is a ceramic.

12. The electro-optic modulator, as in claim 1, wherein said buffer layer is a polymer.

13. The electro-optic modulator, as in claim 1, wherein said buffer layer is a multilayer combination of silicon dioxide and a ceramic.

14. The electro-optic modulator, as in claim 1, wherein said inter-electrode gap width, W, between the center electrode and the grounded electrodes is between 30 $\mu$m and 100 $\mu$m.

15. The electro-optic modulator, as in claim 14, wherein said increase in inter-electrode gap width, W, is such that there is no appreciable associated increase in voltage-length product in the etched-ridge, coplanar structure when utilizing a Z-cut lithium niobate substrate.

16. An electro-optic modulator comprising:
a substrate having electro-optic effects and a first and second optical waveguides forming a Mach-Zehnder interferometer for receiving and transmitting light therethrough in a selected direction with a first phase velocity, said substrate being comprised of Z-cut lithium niobate;
said substrate having a plurality of etched ridge structures of a predetermined depth and separation between ridges;
a buffer layer disposed on the plurality of ridge structures, said buffer layer being comprised of silicon dioxide; and
a microwave waveguide electrode structure comprised of a center electrode and two grounded electrodes, said center electrode is separated from each grounded waveguide by a predetermined distance, disposed on a plurality of preselected ridge structures and receiving an electrical signal, propagating in said selected direction with a second phase velocity, modulating the light in the plurality of optical waveguides as a function and frequency of the electrical signal, said first phase velocity and said second phase velocity are approximately equal, said microwave waveguide electrode structure being comprised of gold;
wherein an inter-electrode gap width, W, between the center electrode and the grounded electrodes is between 30 $\mu$m and 100 $\mu$m, wherein said increase in inter-electrode gap width, W, is such that there is no appreciable associated increase in voltage-length product in the etchedridge, coplanar structure;
said first optical waveguide is disposed underneath said center electrode; and
said second optical waveguide is disposed underneath one of the grounded electrodes.

17. An electro-optic modulator comprising:
a substrate having electro-optic effects; and a first and second optical waveguides forming a Mach-Zehnder interferometer for receiving and transmitting light therethrough in a selected direction and with a first phase velocity;
said substrate being comprised of Z-cut lithium tantalate;
said substrate having a plurality of etched ridge structures of a predetermined depth and separation between ridges;
a buffer layer disposed on the plurality of ridge structures;
said buffer layer being comprised of silicon dioxide;
a microwave waveguide electrode structure comprised of a center electrode and two grounded electrodes, said center electrode is separated from each grounded waveguide by a predetermined distance, disposed on a plurality of preselected ridge structures and receiving an electrical signal, propagating in said selected direction with a second phase velocity, modulating the light in the plurality of optical waveguides as a function and frequency of the electrical signal, said first phase velocity and said second phase velocity are approximately equal;
said microwave waveguide electrode structure being comprised of gold;
wherein an inter-electrode gap width, W, between the center electrode and the grounded electrodes is between 30 $\mu$m and 100 $\mu$m, wherein said increase in inter-electrode gap width, W, is such that there is no appreciable associated increase in voltage-length product in the etched-ridge, coplanar structure;
said first optical waveguide is disposed underneath said center electrode; and
said second optical waveguide is disposed underneath one of the grounded electrodes.

18. The electro-optic modulator, as in claim 17, wherein:
each of said center and grounded electrodes are comprised of copper.

19. The electro-optic modulator, as in claim 17 wherein:
each of said center and grounded electrodes are comprised of any high conductivity material.

20. An electro-optic modulator comprising:
a substrate having electro-optic effects; and a first and second optical waveguides forming a Mach-Zehnder interferometer for receiving and transmitting light therethrough in a selected direction and with a first phase velocity, said substrate being comprised of any Z-cut ferroelectric material;
said substrate having a plurality of etched ridge structures of a predetermined depth and separation between ridges;
a buffer layer disposed on the plurality of ridge structures, said buffer layer being comprised of silicon dioxide;
a microwave waveguide electrode structure comprised of a center electrode and two grounded electrodes, said center electrode is separated from each grounded waveguide by a predetermined distance, disposed on a plurality of preselected ridge structures and receiving an electrical signal, propagating in said selected direction with a second phase velocity, said first phase velocity and said second phase velocity are approximately equal, modulating the light in the plurality of optical waveguides as a function and frequency of the electrical signal;
said microwave waveguide electrode structure being comprised of gold; and
wherein an inter-electrode gap width, W, between the center electrode and the grounded electrodes is between 30 $\mu$m and 100 $\mu$m, wherein said increase in inter-electrode gap width, W, is such that there is no associated increase in voltage-length product in the etched-ridge, coplanar structure;
said first optical waveguide is disposed underneath said center electrode; and said second optical waveguide is disposed underneath one of the grounded electrodes.

21. The electro-optic modulator, as in claim 20, wherein each of said center and grounded electrodes are comprised of copper.

22. The electro-optic modulator, as in claim 20, wherein each of said center and grounded electrodes are comprised of any high conductivity material.

* * * * *